United States Patent
Freund

(10) Patent No.: US 7,369,048 B2
(45) Date of Patent: May 6, 2008

(54) RFID SYSTEMS AND GRAPHIC IMAGE FUSION

(75) Inventor: Robert Frank Freund, Waynesville, OH (US)

(73) Assignee: Fusion Graphics, Inc., Centerville, OH (US)

( * ) Notice: Subject to any disclaimer, the term of this patent is extended or adjusted under 35 U.S.C. 154(b) by 164 days.

(21) Appl. No.: 11/167,574

(22) Filed: Jun. 27, 2005

(65) Prior Publication Data

US 2006/0176180 A1   Aug. 10, 2006

Related U.S. Application Data

(60) Continuation-in-part of application No. 10/389,831, filed on Mar. 17, 2003, now Pat. No. 7,166,249, which is a division of application No. 09/521,127, filed on Mar. 7, 2000, now Pat. No. 6,544,634.

(60) Provisional application No. 60/125,316, filed on Mar. 19, 1999.

(51) Int. Cl.
*G08B 13/14* (2006.01)

(52) U.S. Cl. .............. 340/572.1; 340/572.4; 340/572.8; 343/873; 264/132

(58) Field of Classification Search ........... 340/572.1, 340/572.4, 572.8; 343/873; 264/132
See application file for complete search history.

(56) References Cited

U.S. PATENT DOCUMENTS

| | | | |
|---|---|---|---|
| 4,330,578 A | 5/1982 | Nishihira et al. |
| 4,369,157 A | 1/1983 | Conner |
| 4,418,033 A | 11/1983 | Hatakeyama |
| 4,427,615 A | 1/1984 | Eskesen |
| 4,544,184 A | 10/1985 | Freund et al. |
| 4,650,533 A | 3/1987 | Parker et al. |
| 4,808,366 A | 2/1989 | Kaminski et al. |
| 4,861,644 A | 8/1989 | Young et al. |
| 4,892,779 A | 1/1990 | Leatherman et al. |
| 4,983,348 A | 1/1991 | Barresi et al. |
| 5,227,222 A | 7/1993 | Ogawa et al. |
| 5,338,396 A | 8/1994 | Abdala et al. |
| 5,512,227 A | 4/1996 | Grazioli |
| 5,514,427 A | 5/1996 | Ellison et al. |
| 5,536,539 A | 7/1996 | Ellison et al. |
| 5,591,384 A | 1/1997 | Abrams et al. |
| 5,626,339 A | 5/1997 | Schickert et al. |
| 5,629,029 A | 5/1997 | Souder et al. |
| 5,637,329 A | 6/1997 | Abrams et al. |
| 5,658,672 A | 8/1997 | Lenke et al. |
| 5,676,981 A | 10/1997 | Miyazawa et al. |

(Continued)

*Primary Examiner*—Tai Nguyen
(74) *Attorney, Agent, or Firm*—Dinsmore & Shohl LLP

(57) ABSTRACT

A security and/or tracking information and graphic image fusion system to be used with verification equipment to provide a tamper proof labeled article having security and/or tracking information thereon. The label comprises a printable sheet having at least one RFID device thereon, and an outer layer thereon. The RFID device provides security and/or tracking information for the labeled article. The label may further include at least one visible image printed thereon. To provide additional layers of security, at least one invisible IR or UV image, or both, may also be printed on the printable sheet to provide security and/or tracking information. The visible image provides the graphic image. The label is permanently fused by an in-mold molding process to an article made of plastic, rubber or the combination thereof to render it tamper proof.

49 Claims, 5 Drawing Sheets

U.S. PATENT DOCUMENTS

| | | |
|---|---|---|
| 5,698,283 A | 12/1997 | Yamasaki et al. |
| 5,705,255 A | 1/1998 | Grazioli |
| 5,707,472 A | 1/1998 | Smith |
| 5,711,839 A | 1/1998 | Dronzek, Jr. |
| 5,795,527 A | 8/1998 | Nakamura et al. |
| 5,800,757 A | 9/1998 | Abrams et al. |
| 6,007,759 A | 12/1999 | Ten Tije et al. |
| 6,106,110 A | 8/2000 | Gundjian et al. |
| 6,107,920 A * | 8/2000 | Eberhardt et al. ....... 340/572.7 |
| 6,236,753 B1 * | 5/2001 | Inamoto .................... 382/189 |
| 6,661,339 B2 | 12/2003 | Muirhead |
| 6,943,678 B2 | 9/2005 | Muirhead |
| 2003/0136503 A1 | 7/2003 | Green et al. |
| 2004/0074973 A1 | 4/2004 | Schneck et al. |
| 2004/0168618 A1 | 9/2004 | Muirhead |
| 2004/0238098 A1 | 12/2004 | Bleckmann et al. |
| 2005/0237184 A1 | 10/2005 | Muirhead |
| 2005/0241548 A1 | 11/2005 | Muirhead |

* cited by examiner

RFID SYSTEMS AND GRAPHIC IMAGE FUSION

CROSS REFERENCE TO RELATED APPLICATIONS

This application is a continuation-in-part of U.S. application Ser. No. 10/389,831 filed Mar. 17, 2003 now U.S. Pat. No. 7,166,249, which is a division of U.S. application Ser. No. 09/521,127 filed Mar. 7, 2000 now U.S. Pat. No. 6,544,634 (the disclosure of which is hereby incorporated by reference), which claims the benefit of U.S. provisional application Ser. No. 60/125,316 filed Mar. 19, 1999.

BACKGROUND OF THE INVENTION

The present invention relates to labels and methods of producing labels that may be incorporated into plastic products, rubber products, and the like by fusion to provide security information and a graphic image. The present invention is further related to labels that provide security and/or tracking information, and labeled articles incorporating the labels.

Plastic and rubber materials are used to form and package a wide variety of products. However, many products or packaging may be subject to fraudulent or illegal sale or distribution. Additionally, plastic or rubber products or packaging may be subject to counterfeiting. For example, injectable and oral drugs may be packaged in plastic or rubber packaging, and these drugs may be subject to fraudulent sale or distribution. Such fraudulent use of plastic and rubber products may be detrimental to the health and safety of consumers. Additionally, the fraudulent sale or distribution of plastic and rubber products may adversely affect the profitability of manufacturers and sellers of the products and packaging.

There remains a need in the art for labels that provide authentication and verification of plastic and rubber products and allows for tracking of these products.

SUMMARY OF THE INVENTION

The present invention relates to a system for providing security and/or tracking information using a labeled article, a labeled article for use in such a security and/or tracking system, and labels for use in the labeled article. The security and/or tracking system includes a labeled article having a label with at least one RFID (radio frequency identification) device thereon to provide security and/or tracking information. An RFID device is comprised of at least one RFID antenna and at least one RFID chip. The RFID chip stores at least one unique radio frequency that provides the security and/or tracking information. In addition, at least one invisible IR or UV image (or both) may also be printed thereon to provide security information. The security system includes at least one verification system that is programmed to verify the security information provided by the RFID device, and may also included at least one verification system that is programmed to verify the security information provided by the UV or IR images.

The label comprises a printable sheet, which may be a precipitated silica filled micro-porous material, at least one RFID device positioned on the printable sheet, at least one visible image printed thereon, and a layer covering the printable sheet. In a preferred embodiment of the invention, the label may also comprise at least one invisible IR or UV (or both) on the printable sheet.

The at least one IR image is preferably printed on the printable sheet using inks selected from lithographic, gravure, flexographic, screen inks and combinations thereof, such that the at least one visible image at least partially overlies the at least one IR image. Preferably the IR image has a wavelength of between about 800 angstroms and about 3000 angstroms. A plurality of invisible IR images may be used to provide security information, such as bar codes, or a dot matrix pattern. Most preferred is an invisible IR image configured such that it exhibits an expected change in absorption and reflection in providing the security information.

The at least one invisible UV image is preferably printed on the printable sheet such that it at least partially overlies the at least one visible image. The UV image may be a plurality of invisible UV images with a small variation in wavelength, and may contain a trace molecular chemical to enhance its security feature, which may be in the form of bar codes, or dot matrix pattern, or a block print. As with the IR image, the UV image may exhibit an expected change in absorption and reflection in providing the security information. Likewise a printed sheet having one UV image printed over another UV image, which images are detected using optical spectroscopy, may be used to provide security information.

The RFID antenna may be printed onto the printable sheet. The RFID chip is attached to the RFID antenna by means of a light sensitive adhesive. The at least one visible image at least partially overlies the RFID chip and antenna. The RFID chip stores unique radio frequencies, which are used to provide security and/or tracking information.

In a preferred embodiment, both an invisible IR image(s) and an invisible UV image(s) are used in combination with an RFID device to provide multiple layers of security and/or tracking information.

In accordance with another embodiment, a system for removing multiple labels from a label medium is provided. The system comprises a label medium including a plurality of labels, wherein the labels comprise a printable sheet having at least one RFID device bonded thereon. The system also comprises a die cutting station comprising a tool arm configured to remove the labels from the label medium, and a transfer mechanism configured to feed the label medium to the die cutting station, transfer the label medium through the die cutting station, and deliver the label medium out of the die cutting station after the labels have been removed. The removed labels are configured such that the labels may be applied in-mold to an article.

In accordance with another embodiment, a system for producing multiple labels is provided. The system comprises a label medium including a plurality of unbonded labels, wherein the unbonded labels comprise printable sheets. The system comprises at least one RFID device feeding mechanism operable to couple a plurality of RFID devices to the plurality of unbonded labels. The plurality of RFID devices have an RFID chip and are configured to provide security/ and or tracking information. Moreover, the system comprises at least one adhesive supply operable to provide an adhesive to be applied to the plurality of unbonded labels, wherein the adhesive is operable to couple the RFID devices to the plurality of unbonded labels. Moreover, the tool arm is configured to receive the RFID chip from the RFID feeding mechanism and attach the RFID chip to the plurality of unbonded labels at a location where the adhesive material was applied. The system also comprises a curing station adapted to bond the RFID devices to the plurality of unbonded labels, and a transfer mechanism configured to transfer the label medium through the system, wherein the removed labels are configured such that the labels may be applied in-mold to an article.

The label of the present invention may be used to provide a labeled article by permanently in-mold fusing the label to an article made of plastic, rubber or the combination thereof.

These and additional features and advantages provided by the RFID system embodiments of the present invention will be more fully understood in view of the following detailed description, the accompanying drawings, and the appended claims.

BRIEF DESCRIPTION OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
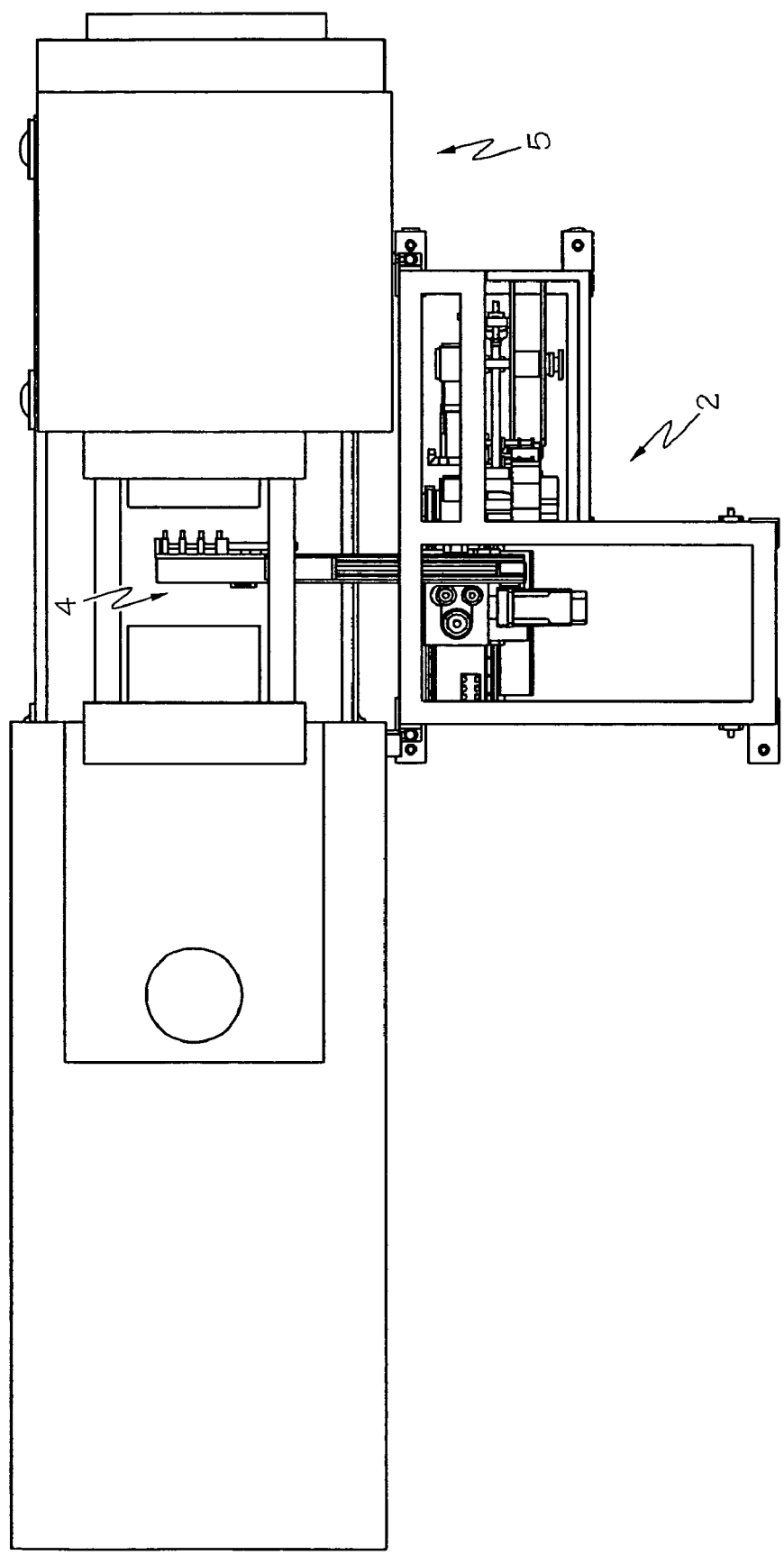
FIG. 1 is one overhead schematic view of a die cutting station and molding station according to one or more embodiments of the present invention.

In accordance with an embodiment of the present invention, a label comprising a printable sheet, a visible image, and an RFID device is provided. The label may be incorporated into a variety of thermoplastic, thermoset, and rubber material based products, and the label may be fused into the surface of the thermoplastic, thermoset, or rubber material thereby making the label essentially tamper proof. The printable sheet has at least one visible image printed thereon, and the printable sheet has at least one RFID device positioned thereon. Other preferred embodiments of the present invention also include invisible images printed thereon.

The printable sheet may have a thickness of about ten mil or less. The printable sheet is made of a material that can survive the tortuous injection molding environment and one that is in-moldable with a wide variety of thermoplastic and thermoset materials. The printable sheet may be made of any suitable material such as precipitated silica filled micro-porous sheet materials commercially available in the marketplace. Such materials exhibit varying degrees of robustness in the tortuous injection-molding environment. For example, material sold by PPG Industries, Pittsburgh, Pa. under the trade name Teslin or MiST™ is, when properly coated as explained herein, found to be satisfactory for the most demanding molding environments including thermoset applications where the material will be exposed to high temperatures for extended time periods for curing. Other materials, such as Artisyn™ manufactured by Daramic, Inc. of Owensboro, Ky. are generally satisfactory for thermoplastic injection molding applications if treated using layers to improve their tensile properties and stability in the mold. Use of surface treatment layers make ten mil thickness material suitable in all applications and makes seven mil thickness material suitable in many applications.

The visible images, i.e. graphic images, may be printed using any suitable ink. For example, the inks may be selected to produce the highest quality graphic images and survive the molding process while also exhibiting excellent flexibility and resistance to fading in UV light. With respect to said inks, there are families of satisfactory lithographic, gravure, flexographic, and screen inks available in the marketplace from a number of sources by referring to inks suitable for use with PPG Industries Teslin® printable sheet. The use of such inks helps obtain a quality print of visible images on silica-filled micro-porous sheet materials. Reference is made to the Grafusion™ series of lithographic inks and the GRA series of screen inks which have been optimized for the aforementioned silica filled micro-porous materials and which demonstrate the flexibility and robustness to provide and maintain a high quality graphic image through a tortuous injection molding process. Both of these series of inks exhibit exceptional fade resistance in prolonged UV exposure. These inks are available from Fusion Graphics of Dayton, Ohio. Such inks comprise a pigment and carrier, which are formulated to withstand temperatures of up to 600° F. The visible images may be printed in any suitable manner. For example, the visible images may be printed utilizing lithography, screen printing, flexography, high-resolution ink jet printing, and color or monochrome electrostatic laser printing.

The RFID antenna may be printed onto the printable sheet by any suitable means. The RFID antenna may be printed using any conductive material, such as conductive ink. The RFID chip is attached to the RFID antenna by any suitable adhesive. In a preferred embodiment, the RFID chip and the RFID antenna are bonded together by applying a UV or IR sensitive adhesive between the chip and the antenna, and subsequently exposing the UV or IR sensitive adhesive to light.

The invisible image may be formed in any suitable manner. For example, the invisible image may be an IR image. The IR image may be printed with any suitable IR ink. Suitable IR inks are generally inks that are visible only under light that is at or near IR in wavelength. For example, the ink may be visible under light having a wavelength of from about 800 angstroms to about 3000 angstroms. On the other hand, an invisible image, which may be a UV image, may be printed over the visible image and, then, excited by a UV light source. Preferably the label of the present invention has both an IR image and a UV image printed thereon in combination with an RFID device. Flint Ink Corp. of Franklin, Ohio, Kennedy Ink Co., of Dayton, Ohio and Angstrom Technologies, Inc. of Erlanger, Ky. provide both UV and IR inks.

The RFID device provides security and/or tracking information. The RFID antenna receives a current from at least one verification device. The RFID antenna, which is a suitable conductor, transfers the current to the RFID chip, thereby exciting the RFID chip. Once excited, the RFID chip provides at least one unique radio frequency signal, which constitutes the security and/or tracking information stored on the RFID chip. The verification device receives the radio frequency signal, and is thereby provided with numerous pieces of information. For instance, the radio frequency signals allow the verification device to detect the location of a labeled article that contains the RFID device at significant distance.

The invisible image is also configured to provide security information. For example, the IR image may be one image or a plurality of images, and the IR image may be any suitable image. Suitable images include, but are not limited to, a bar code or a dot matrix pattern. The bar code or dot matrix pattern may comprise the security information. Images may comprise a multilayer logo with two wavelengths of electronically detectable and readable data, like a solid bar with a variable bar printed directly on top yet only seen with electronic detection and spectroscopy. The IR images may be printed in any suitable manner. For example, the IR images may be printed utilizing lithography, screen printing, flexography, high-resolution ink jet printing, and color or monochrome electrostatic laser printing.

It will be understood that the IR image formed from IR ink may be excited by an IR light source and read electronically to detect the presence and shape of the IR image. The same is true for UV inks. Thus, the presence of the security information may be verified, and the security information may be read to provide information such as the authenticity of the label. Additionally, the IR image may be read by electronic equipment to detect the rise and fall of the rates of absorption and reflection of the IR image. The rates of absorption and reflection are traits that may be controlled during the manufacturing process of the label, and these traits provide information that may be provided to verification equipment. Thus, these traits may additionally comprise security information. The verification equipment may then be used to verify the identity and authenticity of the label by reading the security information provided by the IR image. The printed IR or UV image can be electronically detected by illuminating the images with an appropriate light source and reading them with a filtered CCD electronic camera. Using the camera and a computer it is possible to detect a variation less than 0.05% in difference. These images cannot be seen with the eye or with any other photographic technologies and since the wavelengths to be detected and the images are only a few wavelengths apart, it is extremely difficult to impossible to replicate the chemical response and print correct intensity in the blind.

The printable sheet may have a layer or layers over the printable sheet that aid the molding process and provide added permanence to the printed image in abrasive, chemical, or UV light exposure environments. The outer layer(s) may be applied in any suitable manner. For example, the outer layer(s) may be applied by coating the printable sheet by lithography, screen printing, application of curable silicone, and roll coating with the layers. Alternatively, the outer layer(s) may be applied to the printable sheet by lamination. The outer layer or layers are generally applied over the visible and invisible images. The roll coat or lamination methods are preferred for cost and performance reasons.

With respect to the layers, there are families of UV energy cross-linkable layers that provide the said printed silica-filled micro-porous materials with the desirable performance enhancements. By the nature of their molecular level changes during curing such layers enhance the tensile properties of the printed sheets reducing the tendency of the sheet to stretch as molten material flows over the sheet to its edges. Increasing the tensile properties also allows the use of thinner material such as seven mil thickness; this is important because it reduces the cross section presented at the sheet edge where an excessive thickness induces disruption of the material flow causing said sheet to lift from the mold surface. The increases in tensile properties are also of value in minimizing stretch thus making the printable sheets usable in a continuous roll fed sheet extrusion process where graphics are fused to extrudate as it is produced.

By the nature of the molecular changes that occur during curing, the layers also protect the ink during molding processes and provide the printable sheets with an increased surface coefficient of friction, which significantly enhances the stability of the printed sheet within the mold during tortuous molding processes. Such sheet stability lowers the potential movement or float of the printed sheet as molten material flows over the sheet to its edges. The stability enhances high yield during tortuous molding processes.

When needed, such layers can be formulated and are commercially available which also enhance the resistance of the printed sheets from degradation by chemicals such as petroleum distillates and solvents which could contact the surface of the product in many applications. When needed such layers can also be formulated and are commercially available to enhance the resistance of any of the products to color fading from protracted exposure to UV light in outdoor or other high sunlight exposure applications. Such layers may also provide suitable dielectric performance so that printed and coated sheets can be held in the mold cavities using electrostatic means without the degradation or dissipation of the electrostatic charge prior to mold closure and completion of the molding process.

In accordance with an embodiment of the present invention, the coating may be a UV curable clear coating material having a coefficient of friction greater than 0.5. The coating may be a UV curable clear coating having a cured gloss of greater than 55%. Additionally, the coating may impart enhanced properties to the printable sheet. For example, the coating may impart outdoor resistance to UV induced image fading for five to ten years, resistance to image degradation from contact with petroleum based materials or solvents, and/or resistance to underfoot slippage of greater than a 0.6 coefficient of friction as tested under ASTM D2047.

Satisfactory, but not optimum, UV curable layers are available from a number of sources by specifying a clear coat that will adhere to lithographic printed images and which exhibits whatever performance factors such as those cited above are needed for the specific application. A suitable series of such layers has been optimized to enhance the most important properties for the majority of product applications is the GRA series of layers, which are clear variants of the screen inks previously cited. These layers are available from Fusion Graphics of Dayton Ohio. Such layers are UV crosslinkable layers that may contain an acrylate ester.

In accordance with an embodiment of the present invention, the label may have invisible ultraviolet (UV) ink printed over the visible image to produce a UV image. The UV image is configured to provide security information. The UV image may be produced by using any suitable UV ink. Examples of suitable UV inks include, but are not limited to, those available from Angstrom Technologies Inc. and Kennedy Ink Co. UV ink is generally invisible to the human eye unless placed under a UV light. For example, the UV ink may be visible when placed under a long wave UV light. The UV image may be any suitable image. For example, the image may be a dot matrix pattern, a bar code, or the image may be a block print that covers the visible image, and the UV images may comprise security information. The UV image may be layered with the layer or layers over the UV image. The UV images may be printed in any suitable manner. For example, the UV images may be printed utilizing lithography, screen printing, flexography, high-resolution ink jet printing, and color or monochrome electrostatic laser printing. It is possible to manufacture multiple UV inks and with small variations in wavelength of the same color. This allows for printing, for example, a yellow solid bar image and then over the same solid bar print a yellow custom bar code image and then use the Raman spectroscopy process to determine the forensic validity of the images, we may also add a trace molecular chemical that only can be detected using spectroscopy, further adding additional levels of security.

It will be understood that the UV image may be excited by an UV light source and read electronically to detect the presence and shape of the UV image. Thus, the presence of the security information provided by the UV image may be verified, and the security information may be read to provide information such as the authenticity of the label. Additionally, the UV image may be read by electronic equipment to detect the rise and fall of the rates of absorption and reflection of the UV image and the density of the UV image. The rates of absorption and reflection and density are traits that may be controlled during the manufacturing process of the label, and these traits provide information that may be provided to verification equipment. These traits may comprise security information. The verification equipment may then be used to verify the identity and authenticity of the label by reading the security information provided by the invisible UV image.

In accordance with an embodiment of the present invention, the labels may be incorporated into plastic or rubber articles made from any suitable materials to form labeled articles. Suitable materials for the articles include polymers such as thermoplastic polymers and thermoset polymers. Suitable polymers include, but are not limited to, polyolefins (polypropylene, polyethylene) polycarbonates, elastomers, polyamides, polystyrene, polyphenylene oxide, polyvinyl chloride, partially devulcanized crumb rubber, crumb rubber filled polymer, and acrylonitrile-butadiene-styrene. Suitable materials also include unvulcanized rubber. Transparent polymers may be used, and the labels may have a visible and/or invisible IR image printed on the front and the back of the labels. Additionally, recycled or regrind materials may be utilized to form the products of the present invention. The recycled or regrind materials may contain non-homogenous and variegated material derived from recycled or regrind stocks.

The labels of the present invention may be incorporated into plastic or rubber articles in any suitable manner. Generally, the labels are permanently fused into the surface of the plastic or rubber material during the manufacture of the article. The labels may be fused into the surface of suitable materials by any suitable process such as molding including thermosetting, vulcanization, and thermoplastic molding and extrusion. Because the labels are permanently fused into the surface of the plastic or rubber material during the manufacture of the article, the labels are essentially tamper proof. Any attempt to remove the label will irreversibly alter the surface of the plastic or rubber material, and such alteration of the surface will be apparent. Thus, the labels provide embedded security information that may be unique to the product.

The labels exhibit high stability in the mold during molding, and the labels may be used in a wide variety of molding techniques. The labels may be introduced into a mold, contacted with the article material, and the labels may then be fused into the article during the molding process. Suitable molding processes include injection, blow, thermoforming, gas assist, structural foam, compression, and rotational molding. The labels may be permanently fused into the surface of an article during extrusion and vulcanization processes.

The labels of the present invention may exhibit improved positional stability in a mold. For example, the label may have dielectric properties that permit positionally stable placement using electrostatic charging of the printable sheet in any position within a mold for over 30 seconds including during the molding process. Such dielectric properties may be imparted by the layers as discussed herein. In another example, the label may have a coefficient of friction between the printable sheet and a mold surface sufficient to resist the force of molding material flowing over the molding side of the printable sheet. Additionally, the label may have a surface that softens sufficiently to produce adhesion to a mold surface sufficient to resist the force of molding material flowing over the molding side of the printable sheet.

The labels of the present invention may be thermoformed to fit complex mold face geometries. For example, the label may be incorporated into a product have a raised area or areas. Additionally, the products may be decorated post mold using any suitable technique such as pad printing, heat transfer, foil transfer, screen printing, airbrush, and application of an adhesive label. In a further example, the label may comprise a three-dimensional printable sheet printed with visible and invisible images as discussed herein. The three dimensional label may be molded with a suitable product to produce a labeled three-dimensional product. The label may be made three-dimensional by a method selected from heat welding, vacuum forming, ultrasonic welding, and coining, and combinations thereof.

It will be understood that the label may be manufactured to contain graphic visible images, RFID devices, and invisible images that are unique to a labeled article. Additionally, the absorption, reflection, and density of the IR and UV images may be controlled during manufacturing, and changes in these rates may be used to identify a particular labeled article. Using the Raman spectrographic technologies allows for the fused label to be uniquely identified, i.e. as a "fingerprint" or "DNA" for that image. The ability to deposit these images as unique individually electronic printed imagery with lots code provide all the aspects to handle fraudulent and gray market distribution of products.

In accordance with another aspect of the present invention, a system for providing security and/or tracking information is provided. The system comprises a labeled article as discussed herein having security and/or tracking information provided thereon. The system must minimally contain a verification system that is programmed to receive the radio frequency signals provided by the RFID device. This verification system comprises verification equipment that may be programmed to interpret the radio frequency signals in any desired manner. In addition, the system may have a verification system that is capable of electronically reading IR and UV images. The verification system comprises verification equipment that may be programmed to interpret the IR and UV images in any desired manner. For example, the verification equipment may be programmed to verify the security information provided on the labeled product. Additionally, the verification equipment may be electronically provided with expected changes in the absorption or reflection of the IR and/or UV images, and the expected changes may be used to verify the identity and authenticity of the labeled product.

Figure 2:
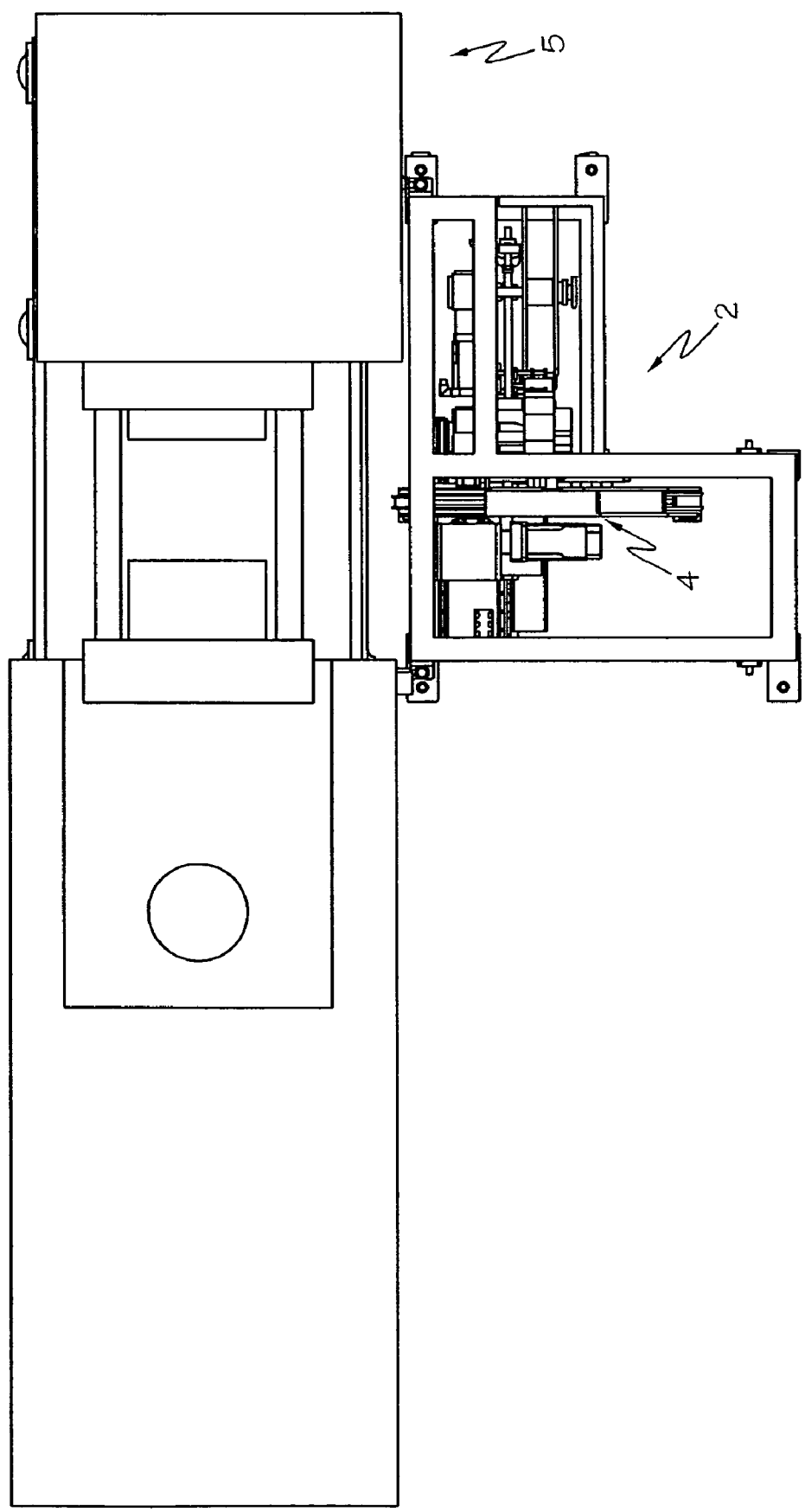
FIG. 2 is a second overhead schematic view of a die cutting station and molding station according to one or more embodiments of the present invention.
Figure 3:
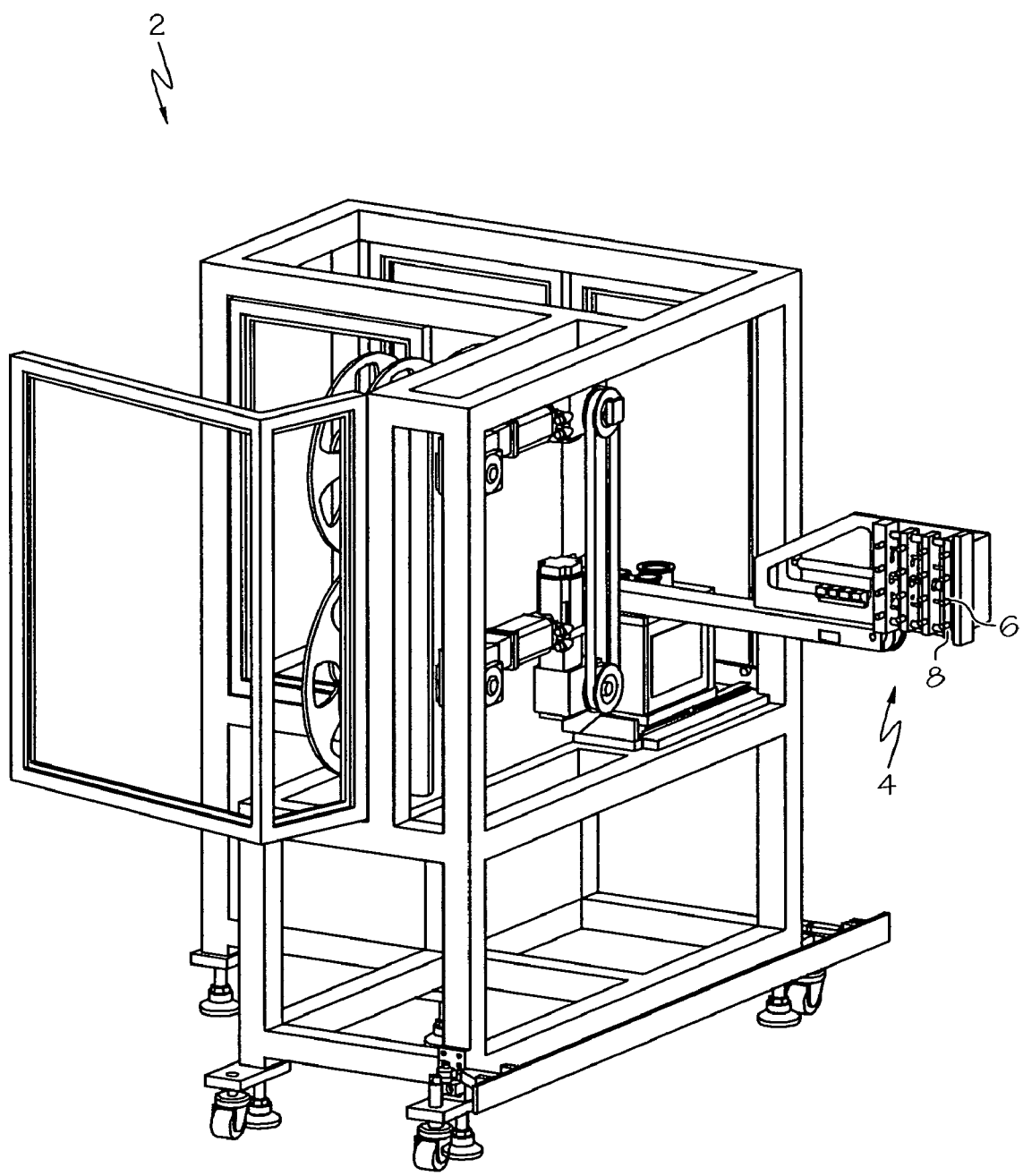
FIG. 3 is a side schematic view of a die cutting station according to one or more embodiments of the present invention.
Figure 4:
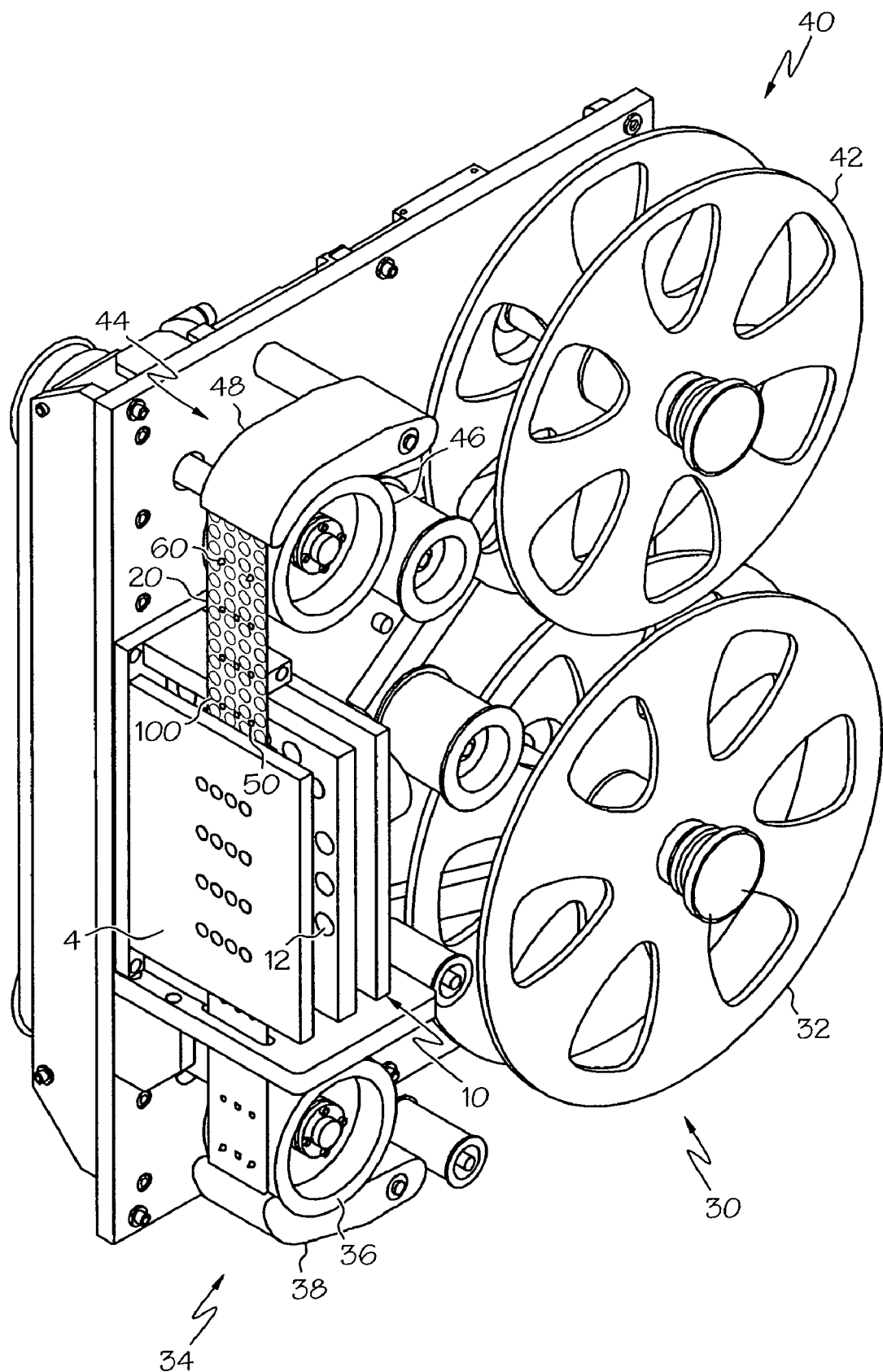
FIG. 4 is a schematic view of a die cutting station according to one or more embodiments of the present invention.

In accord with the present invention as shown in FIGS. 1-4, a system for removing multiple labels 100 from a label medium 20 is provided (see FIG. 4). The system comprises a label medium 20 comprising a plurality of labels 100. The label medium 20 may comprise a sheet, a roll, or any other suitable label-carrying device. The labels comprise a printable sheet having at least one RFID device bonded thereon. In accord with the present invention, numerous possibilities are available for the length and width dimensions of the label medium 20, and the number of labels 100 contained on the label medium. In one embodiment, the label medium 20 contains 4 labels extending across the width of the label medium 20; however, a label medium containing more labels or less labels 100 are contemplated.

Referring to FIGS. 1, 2, and 3, the system also comprises a die cutting station 2 having a tool arm 4 configured to remove the labels 100 from the label medium 20. As shown in FIG. 3, the tool arm typically comprises a plurality of die rods 6 configured to remove the labels 100 from the label medium 20 upon contacting the label medium 20. The die rods 6 may also comprise vacuum cups 8 disposed on the surface of the die rods 6. The vacuum cups 8 are coupled to a vacuum and are typically located in the tool arm 4. After the labels 100 have been removed from the label medium, the vacuum cups 8 are configured to grip the labels 100 by suction. Vacuum cups 8 may comprise many different materials including silicone, vinyl, rubber, polyurethane, PVC, rubber, neoprene, or any other material known to one of ordinary skill in the art. The vacuum cups 8 may be coupled or mounted to the die rods 6 in numerous ways. Typical mounting styles for vacuum cups 8 include spring mount, swivel or pivot mount, and suspension or multi-point mount.

Referring to FIG. 4, the system may also comprise a die cutting support 10 oriented opposite the tool arm 4. The die cutting support 10 includes a plurality of grooves 12 configured to receive the die rods 6 when the die cutting support 10 and tool arm 4 are joined together. The joining of the die cutting support 10 and the tool arm 4 removes the labels 100 from the label medium 20 passing between the die cutting support 10 and the tool arm 4. As shown in FIG. 4, the label medium 20 is aligned in between the tool arm 4 and a die cutting support 10 that comprises of a plurality of grooves 12. The grooves 12 are configured and spaced to receive the die rods 6 when the die cutting support 10 and the tool arm 4 are joined. To cut the labels 100 from the label medium 20, the tool arm 4 and the die cutting support 10 are joined together with the label medium 20 disposed in between the tool arm 4 and the die cutting support 10. The die rods 6 punch holes in the label medium 20 in areas corresponding to the location of the labels 100, and slide into the grooves 12 of the die cutting support 10. After the bales have been cut, the vacuum cups 8 grab and hold the removed labels 100 by suction. The tool arm 4 embodiment in FIG. 4 comprises 16 die rods which produces 16 labels, but many other tool arm 4 embodiments are possible.

In one embodiment, the vacuum cups deliver removed labels 100 to a molding station, wherein the removed labels 100 are configured such that the labels may be applied in-mold to an article. Although the invention emphasizes die cutting for removing labels 100 from a label medium 20, other means of removing or perforating the labels from the label medium are also contemplated.

Referring to FIG. 4, the system may also comprise a transfer mechanism 40 operable to feed the label medium 20 to the die cutting station 2, transfer the label medium 20 through the die cutting station 2, and deliver the label medium 20 out of the die cutting station 2 after the labels 100 have been removed from the label medium 20. In one embodiment, the transfer mechanism 40 comprises a reel-to-reel mechanism. The transfer mechanism 40 may comprise an input reel 32 adapted to receive the label medium 40, and feed the label medium 20 into the die cutting station 2. The transfer mechanism 40 also comprises an output reel 42 configured to receive the label medium 20 after the labels 100 have been removed from the label medium 20.

The input reel 32 and output reel 42 may be coupled to the label medium 20 in numerous ways to provide for movement in and out of the die cutting station 2. The coupling facilitates the transfer of the label medium 20 though the die cutting station 2. In one of these coupling embodiments, the label medium 20 may comprise a plurality of slots 50 disposed throughout. The input reel 32 and output reel 42 may include a plurality of prongs 60 on the outer surface of these mechanisms, wherein the prongs 60 may be inserted into the slots 50 of the label medium 20. The coupling of slots 50 to prongs 60 pulls the label medium 20 though the die cutting station 2. The slots 50 may be located between every row of labels 100, every few rows, or in any other configuration suitable to move the label medium through the die cutting station.

Optionally, the system may also comprise hardware 34 adjacent the transfer mechanism. The hardware 34 is adapted to stabilize the label medium upon delivery and transfer through the die cutting station 2, and may be located adjacent the input reel 32 or the transfer reel 42. The hardware 34 may comprise a guide roller (not shown), a dancer roller 36, a guide arm 38, a dancer arm (not shown), or any combinations thereof. Similarly, the output mechanism 40 may also comprise stabilizing hardware 44, such as a guide roller (not shown), a dancer roller 46, a guide arm 48, a dancer arm (not shown), and combinations thereof, to stabilize the label medium 20 as it exits the die cutting station 2 after the labels 100 have been removed from the label medium 20.

In a further embodiment of the present invention as shown in FIGS. 1 and 2, the system of the present invention may comprise a molding station 5 adjacent the die cutting station 2, wherein the molding station 5 is adapted to fuse the removed labels 100 into an article. In one embodiment, the tool arm 4 of the die cutting station 2, which is operable to extend from the die cutting station 2 into the molding station 5, provides the removed labels 100 to the molding station 5. The tool arm 4, which holds the labels 100 through the use of vacuum cups 8, may extend into the molding station 5 as shown in FIG. 1 in order to provide the labels 100 to the molding station 5 for subsequent encapsulation of the labels 100 in a molding material. For the molding process, the molding station generally utilizes a material comprised of plastic, rubber, or combinations thereof. In one embodiment, the molding station 5 comprises an injection molding apparatus. One possible injection molding apparatus is the Roboshot injection molding apparatus, manufactured by Cincinnati Milacron, which utilizes a robot in the injection molding apparatus.

Figure 5:
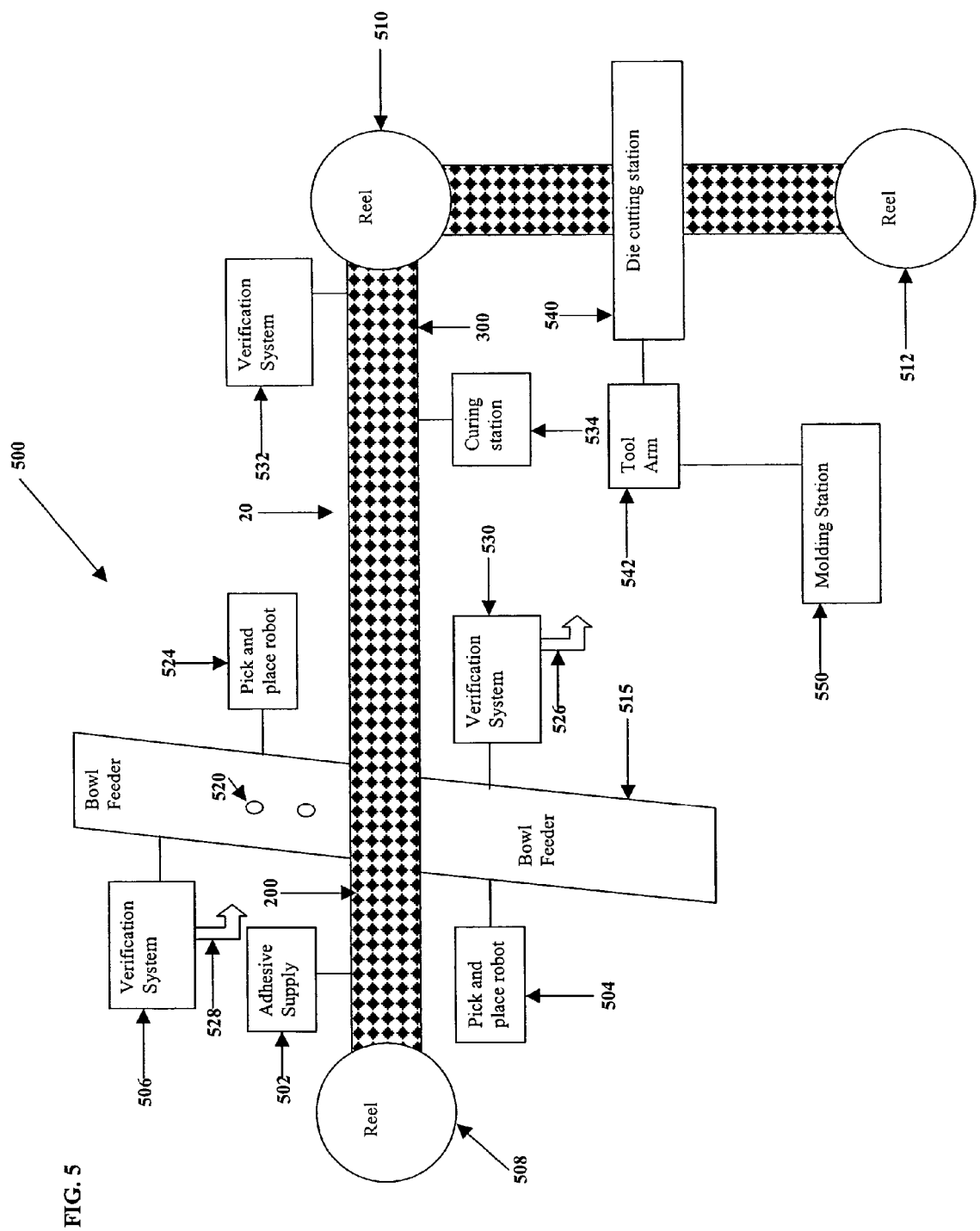
FIG. 5 is a block diagram view of a system for producing labels according to one or more embodiments of the present invention.

According to another embodiment of the present invention as shown is FIG. 5, a system 500 for producing multiple labels is provided. The system includes a label medium 20 comprising a plurality of unbonded labels 200, wherein the unbonded labels 200 comprise printable sheets. These unbonded labels 200 do not at this stage have RFID devices on the printable sheet.

The system 500 also comprises at least one RFID device feeding mechanism operable to provide a plurality of RFID devices 520 for coupling to the plurality of unbonded labels 200. The RFID devices 520 comprise at least one RFID chip and are configured to provide security/and or tracking information. The RFID feeding mechanism 515 may feed RFID devices 520 comprised of RFID chips, or RFID devices comprised of RFID chips and RFID antennas. The RFID feeding mechanism 515 may comprise any suitable conveyor or feeding mechanism known to one or ordinary skill. In one embodiment, the RFID feeding mechanism 515 may comprise a vibratory bowl feeder. In a specific embodiment, the vibratory bowl feeder comprises a gate like mechanism to regulate the number of RFID devices 520 fed. The vibratory bowl feeder is manufactured by Elscint Automation, and many other manufacturers.

Moreover, the system comprises at least one adhesive supply 502 operable to provide an adhesive to be applied to the plurality of unbonded labels 200. The adhesive couples the RFID devices 520 to the plurality of unbonded labels 200 located on the label medium 20. Suitable adhesives may include photosensitive UV or IR adhesives, conductive polymers, or any additional adhesive known to one of ordinary skill in the art. In one embodiment, a UV or IR sensitive adhesive is applied to the unbonded labels 200. The adhesive or epoxy may be cured by exposure to UV or IR rays, which results in the bonding of the RFID device 520 to the previously unbonded label 200. In another embodiment, the adhesive applied to the label medium 20 may comprise a conductive polymer such as a conductive epoxy resin, which has sufficient conductivity to function as an RFID antenna as well as an adhesive.

The system 500 also utilizes at least one tool arm 504 configured to receive the RFID devices 520 from the RFID feeding mechanism and attach the RFID devices 520 to the plurality of unbonded labels 200 at the location where adhesive material is applied. In one embodiment, the tool arm 504 may comprise a pick and place robot 504.

After the RFID devices 520 have been attached, the system 500 utilizes a curing station 534 to bond the RFID devices 520 to the plurality of previously unbonded labels 200. In one embodiment, the curing station 534 comprises a light source operable to bond the RFID devices 520 to the previously unbonded labels 200 by exposing a photosensitive UV or IR adhesive to light. Upon exposure to light, the adhesive bonds the RFID devices 520 to the previously unbonded labels 200 located on the label medium 20.

Moreover, the system 500 comprises a transfer mechanism configured to transfer the label medium 20 through the system 500. In one embodiment, the transfer mechanism may comprise a reel-to-reel device. The system 500 may comprise a reel 508 operable to feed the label medium 20 to the system 500, and another reel 510 operable to receive the plurality of now bonded labels 300 on the label medium 20 after the curing station has bonded the RFID devices 520 to the previously unbonded labels 200 on the label medium 20. As shown if FIG. 4, the system may comprise hardware configured to stabilize the label medium 20 as it is transferred through the system.

Optionally, the system 500 may comprise at least one verification device programmed to receive the security and/or tracking information provided by the RFID devices. In one embodiment, the system 500 may comprise at least one verification device 522 adjacent the RFID feeding mechanism 515. The verification device 522 reads the RFID devices 520 before the RFID devices 520 are delivered to the tool arm 504 for attachment to the unbonded labels 200. In a specific embodiment, the verification device 522 further comprises at least one bypass port 526 coupled to the verification device 522. If the verification device 522 determines that an RFID device is malfunctioning, the bypass port 526 diverts these RFID devices 520 from the feeding mechanism 515 before these malfunctioning RFID devices 520 may be attached to the unbonded labels 200. In one embodiment, the bypass port 526 comprises a venturi tube.

In another embodiment, the system 500 may also comprise at least one verification system 532 is located adjacent the curing station. The verification system 532 reads the bonded labels 300 and detects whether any of the bonded labels 300 are functioning improperly. If the verification system 532 determines that a bonded label 300 is malfunctioning, the verification system 532 will signal that the bonded label 300 is unsuitable for subsequent in-mold fusing into an article.

In a further embodiment of the present invention, the bonded labels 300 may be fed to a die cutting station 540 for removal of the bonded labels 300 from the label medium 20. The die cutting station 540 comprises a tool arm 542 configured to remove the bonded labels 300 from the label medium 20. To transfer the label medium 20 through the die cutting station 540, the system 500 typically utilizes a transfer mechanism that feeds the label medium 20 to the die cutting station 540, transfers the label medium 20 through the die cutting station 540, and delivers the label medium 20 out of the die cutting station 540 after the bonded labels 300 have been removed. As shown in FIG. 5, the transfer mechanism may comprise a reel-to-reel mechanism. In one embodiment, reel 510 may be utilized as part of the reel-to-reel mechanism operable to feed the label medium 20 to the die cutting station 540. Other transfer mechanism configurations are contemplated. The die cutting station 540 may also comprise additional components as described above, and shown in FIGS. 1-4.

In a further embodiment, the system 500 comprises a molding station 550 adjacent the die cutting station 540, the molding station 550 adapted to fuse the removed bonded labels into an article. As shown in FIG. 5, the die cutting station comprises a robot arm 542 operable to transfer the removed bonded labels 300 to the molding station 550, wherein the removed bonded labels 300 will be in-mold fused into an article. The molding station 550 may comprise an injection molding apparatus as described above, and in FIGS. 1 and 2.

It is noted that terms like "generally", "specifically," "preferably," "typically", and "often" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. It is also noted that terms like "substantially" and "about" are utilized herein to represent the inherent degree of uncertainty that may be attributed to any quantitative comparison, value, measurement, or other representation.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A label comprising:
   a printable sheet comprising micro-porous material and having at least one RFID (radio frequency identification) device thereon, and a cured polymeric material applied over the printable sheet, the combination of the micro-porous material and the cured polymeric material being configured to increase the tensile strength of the printable sheet wherein the at least one RFID device is configured to provide security and/or tracking information, and the label is configured such that the label is applied in-mold to an article.

2. The label of claim 1, wherein the printable sheet comprises precipitated silica filled micro-porous material.

3. The label of claim 1, wherein the at least one RFID device comprises at least one RFID antenna printed on the printable sheet, and at least one RFID chip attached to the at least one RFID antenna.

4. The label of claim 3, wherein the at least one RFID antenna is printed onto the label with a conductive ink.

5. The label of claim 3, wherein the at least one RFID chip is bonded to the at least one RFID antenna by an adhesive.

6. The label of claim 5, wherein the adhesive is a UV or IR sensitive adhesive.

7. The label of claim 1, wherein the RFID devices includes an RFID antenna comprised of a conductive adhesive applied to the printable sheet, wherein the adhesive is operable to bond to an RFID chip.

8. The label of claim 1, further including at least one visible image which at least partially overlies the at least one RFID device.

9. The label of claim 1, wherein the RFID device stores at least one radio frequency, and wherein the radio frequency comprises the security and/or tracking information.

10. The label of claim 1, wherein the at least one visible image is printed with inks selected from lithographic, gravure, flexographic, and screen inks, and combinations thereof.

11. A label comprising:
a printable sheet having at least one invisible IR or UV image printed thereon;
at least one visible image printed thereon;
at least one (radio frequency identification) RFID device thereon; and
an outer layer thereon, wherein
the at least one RFID device is configured to provide security and/or tracking information;
the at least on invisible IR or UV image is configured to provide security information; and
the label is configured such that the label is applied in-mold to an article.

12. The label of claim 11, wherein the printable sheet comprises precipitated silica filled micro-porous material.

13. The label of claim 11, wherein the at least one RFID device comprises at least one RFID antenna and at least one RFID chip.

14. The label of claim 13, wherein the at least one RFID antenna is printed onto the label by a conductive ink.

15. The label of claim 14, wherein the at least one RFID chip is bonded to the at least one RFID antenna by an adhesive.

16. The label of claim 15, wherein the adhesive is a light sensitive adhesive.

17. The label of claim 11, wherein the at least one visible image at least partially overlies the at least one RFID device.

18. The label of claim 11, wherein the at least one RFID device stores at least one radio frequency, and wherein the at least one radio frequency comprises the security and/or tracking information.

19. The label of claim 11, wherein the at least visible image is printed with inks selected from lithographic, gravure, flexographic, and screen inks, and combinations thereof.

20. The label of claim 11, wherein the at least one invisible image comprises at least one IR image which is printed on the printable sheet such that the at least one visible image at least partially overlies the at least one invisible IR image.

21. The label of claim 11, wherein the at least one invisible IR image is visible under light having a wavelength between 800 angstroms to about 3000 angstroms.

22. The label of claim 11, wherein the at least one invisible IR image comprises a plurality of invisible IR images.

23. The label of claim 11, wherein the at least one invisible IR image comprises a bar code, and wherein the bar code comprises the security information.

24. The label of claim 11, wherein the at least one invisible IR image comprises a dot matrix pattern, and wherein the dot matrix pattern comprises the security information.

25. The label of claim 11, wherein the invisible IR image is configured such that the invisible image exhibits an expected change in absorption and reflection, and wherein the excepted change in absorption and reflection comprises the security information.

26. The label of claim 11, wherein the at least one invisible image is at least one UV image printed on the printable sheet, such that the at least one invisible UV image at least partially overlies the at least one visible image.

27. The label of claim 26, further including a trace molecular chemical in the invisible UV image.

28. The label of claim 26, wherein the at least one invisible UV image comprises a plurality of invisible UV images.

29. The label of claim 26, wherein the at least one invisible UV image comprises a bar code, and wherein the bar code comprises the security information.

30. The label of claim 26, wherein the at least one invisible UV image comprises a dot matrix pattern, and wherein the dot matrix pattern comprises the security information.

31. The label of claim 26, wherein the at least one invisible UV image comprises a block print over the visible image, and wherein the block print comprises the security information.

32. The label of claim 26, wherein one image may be printed over another UV image and detected using optical spectroscopy.

33. The label of claim 26, wherein the invisible UV image is configured such that the invisible UV image exhibits an expected change in absorption and reflection, and wherein the expected change in absorption and reflection comprises the security information.

34. The label of claim 26, wherein the at least one invisible IR image is printed on the printable sheet such that the at least one visible image overlies the at least one IR image and at least one invisible UV image is printed on the printable sheet such that the at least one invisible UV image at least partially overlies the at least one visible image.

35. A labeled article, comprising
an article comprising a material selected from plastic, rubber, and combinations thereof;
a label comprising a printable sheet comprising microporous material and having at least one (radio frequency identification) RFID device thereon, and a cured polymeric material applied over the printable sheet, the combination of the micro-porous material and the cured polymeric material being configured to increase the tensile strength of the printable sheet wherein:
the at least one RFID device is configured to provide security and/or tracking information; and
the label is permanently fused to the article during the manufacture of the article.

36. The labeled article of claim 35, further including at least one visible image which at least partially overlies the at least one RFID device.

37. A labeled article, comprising
an article comprising a material selected from plastic, rubber, and combinations thereof;
a label comprising a printable sheet having at least one invisible IR or UV image printed thereon, at least one visible image printed thereon, at least one (radio frequency identification) RFID device thereon and an outer layer thereon, wherein:
the at least one RFID device is configured to provide security and/or tracking information;
the at least one invisible IR or UV image is configured to provide security and/or tracking information; and
the label is permanently fused to the article during the manufacture of the article.

38. The labeled article of claim 37, wherein the at least one invisible image is at least one invisible UV image printed on the printable sheet such that the at least one invisible UV image at least partially overlies the at least one visible image.

39. The labeled article of claim 37, wherein the at least one invisible image is at least one IR image which is printed on the printable sheet such that the at least one visible image at least partially overlies the at least one invisible IR image.

40. The labeled article of claim 37, wherein the at least one visible image at least partially overlies the at least one RFID device.

41. The labeled article of claim 37, wherein the at least one invisible IR image and at least one invisible UV image are printed on the printable sheet,
the at least one invisible IR image being configured to provide security and/or tracking information;
the at least one invisible UV image being configured to provide security and/or tracking information;
the at least one visible image is printed on the printable sheet such that the at least one visible image at least partially overlies the at least one invisible IR image; and
the at least one invisible UV image is printed on the printable sheet such that the at least one invisible UV image at least partially overlies the at least one visible image.

42. A system for providing security and/or tracking information, comprising:
a labeled article comprising a material selected from plastic, rubber, and combinations thereof and a label, wherein:
the label comprises a printable sheet having at least one (radio frequency identification) RFID device thereon, and
an outer layer thereon; and
the at least one RFID device is configured to provide security and/or tracking information; and
the label is permanently fused to the article during the manufacture of the article; and
a verification system comprising verification equipment that is programmed to receive the security and/or tracking information provided by the at least one RFID device on the label.

43. The system of claim 42, further including at least one visible image which at least partially overlies the at least one RFID device.

44. A system for providing security and/or tracking information, comprising:
a labeled article comprising a material selected from plastic, rubber, and combinations thereof and a label, wherein:
the label comprises a printable sheet having at least one (radio frequency identification) RFID device thereon, at least one visible image printed thereon, and an outer layer thereon;
the at least one RFID device is configured to provide security and/or tracking information;
and the at least one invisible IR or UV image is configured to provide security and/or tracking information;
the label is permanently fused to the article during the manufacture of the article;
a verification system comprising verification equipment that is programmed to receive the security and/or tracking information provided by the at least one RFID device on the label; and
a verification system comprising verification equipment that is programmed to verify the security and/or tracking information provided by the at least one invisible IR label.

45. The system of claim 44, wherein the at least one invisible image is at least one invisible IR image which is printed on the printable sheet such that the at least one visible image at least partially overlies the at least one invisible image;
wherein the invisible IR image is configured such that the invisible IR image exhibits an expected change in absorption and reflection, and wherein the verification equipment is programmed to verify the expected change in absorption and reflection.

46. The system of claim 44, wherein the at least one visible image at least partially overlies the at least one RFID device.

47. The system of claim 44, wherein the at least one invisible image is at least one invisible UV image printed on the printable sheet such that the at least one invisible UV image at least partially overlies the at least one visible image.

48. The system of claim 44, wherein the multiple UV images with small variations in wavelength are printed on the label.

49. The system of claim 44, wherein at least one invisible IR image is printed on the printable sheet such that the at least one visible image overlies the at least one IR image and at least one invisible UV image is printed on the printable sheet such that the at least one invisible UV image at least partially overlies the at least one visible image.

* * * * *